United States Patent
Risser

Patent Number: 6,145,670
Date of Patent: Nov. 14, 2000

[54] BATHTUB SPOUT WITH REMOVABLE FILTER

[76] Inventor: William Risser, 5342 Hollister Ave, Santa Barbara, Calif. 93111-2334

[21] Appl. No.: 09/130,718

[22] Filed: Aug. 6, 1998

Related U.S. Application Data

[60] Provisional application No. 60/059,713, Sep. 22, 1997.

[51] Int. Cl.$^7$ .......................... B01D 27/08; B01D 35/02
[52] U.S. Cl. .................. 210/449; 210/282; 210/287; 210/437; 4/678
[58] Field of Search .................. 210/456, 437, 210/449, 460, 289, 287, 282, 291; 4/678

[56] References Cited

U.S. PATENT DOCUMENTS

| | | |
|---|---|---|
| 794,840 | 7/1905 | Barker . |
| 1,081,563 | 12/1913 | Alsterberg . |
| 1,139,331 | 5/1915 | Boulard . |
| 1,181,033 | 4/1916 | Petritz, Sr. . |
| 1,212,104 | 1/1917 | Procker . |
| 1,530,163 | 3/1925 | Forlenza . |
| 2,790,632 | 4/1957 | Mellette . |
| 3,369,665 | 2/1968 | Paulson . |
| 3,519,134 | 7/1970 | Hassinger . |
| 3,739,806 | 6/1973 | Bucknell et al. . |
| 3,770,129 | 11/1973 | Brumfield et al. ............ 210/232 |
| 3,789,911 | 2/1974 | Bachner ............... 164/459 |
| 3,822,018 | 7/1974 | Krongos ............ 210/323.2 |
| 4,017,046 | 4/1977 | Hicks ................ 248/55 |
| 4,322,292 | 3/1982 | Knox . |
| 4,706,702 | 11/1987 | Grasseschi . |
| 4,798,672 | 1/1989 | Knight .............. 210/282 |
| 5,510,031 | 4/1996 | Knauf, Jr. et al. ........... 210/460 |
| 5,549,822 | 8/1996 | Ferguson .............. 210/238 |
| 5,823,229 | 10/1998 | Bertrand et al. ........... 137/614.2 |

*Primary Examiner*—Joseph W. Drodge
*Assistant Examiner*—Michael Fleming
*Attorney, Agent, or Firm*—Leo F. Costello

[57] ABSTRACT

A bathtub spout water filter for use with a bathtub spout having a spout body with an open rear, and an open front for water egress with a female threaded fitting located behind the open front. The bathtub spout water filter has a frustum-shaped filter body with enclosing sidewalls, a rearwardly extending male threaded end for water ingress adapted to screw into a bathtub spout water supply line, and a frontwardly extending male threaded end for water egress and adapted to screw into the female threaded fitting in the bathtub spout. Filter material is contained within the enclosed filter body.

9 Claims, 3 Drawing Sheets

BATHTUB SPOUT WITH REMOVABLE FILTER

This application claims the benefit of U.S. Provisional Application Ser. No. 60/059,713, filing date, Sep. 22, 1997.

FIELD OF INVENTION

The invention relates generally to a water purification device, and more particularly to a compact bathtub spout filter adapted to be contained within a bathtub spout.

BACKGROUND OF THE INVENTION

As concerns about the quality of tap water grows, more and more people are buying purified drinking water and are installing water purification systems and filters to their potable water systems. Shower filter adapters have been available for some time, and these filters can effectively remove many minerals, chemicals, and other contaminants from the shower water.

An example of some known prior art shower filters is U.S. Pat. No. 5,549,822 to Ferguson. Ferguson discloses a relatively large, bulky and short shower filter arrangement which has a filter body threaded at both ends and which screws between a shower head and a neck extending from the shower stall's wall. The Ferguson patent is directed to the baffling arrangement, which arrangement provides for a large capacity filter element, yet which does not extend the length of the neck to a great degree, thereby preventing the shower head from projecting further down and impinging onto the head of the person taking a shower, which can be a problem for tall people.

U.S. Pat. Nos. 3,789,911 and 3,822,018 to Krongos disclose water filter devices with a built in on/off valves.

U.S. Pat. No. 4,107,046 to Corder teaches a water purifier which includes a filter cartridge which water filter is in the form of a handle which would fit on the end of a hose in a shower.

U.S. Pat. No. 5,510,031 to Knauf, Jr., et al., teaches a water faucet assembly with a replaceable filter for use in kitchen or bathroom sink applications. In the Knauf, Jr. water faucet, the filter element is located below the spout, thereby concealing it below the sink level yet in close proximity to the spout. The Knauf device would appear to require some kind of retrofitting of a standard sink arrangement and is directed to a sink as opposed to a bathtub.

As noted above, there are numerous filter systems available for showers. However, many people also enjoy taking hot baths. However, to the best knowledge of the inventor, heretofore a convenient to use and attractive bathtub water filter which removes chlorine (which is a carcinogenic agent in high doses), bad odors, heavy metals and sediment in the water has not been available. Removing these compounds from bathing water can create a more pleasant and healthful bathing experience. Bathing in purified and filter water can also lead to generally softer skin and hair.

Numerous studies have shown that in a hot shower and bath environment, where the water is often ejected with considerable force and agitation, the chlorine added to water as a prophylactic for bacteria in other harmful agents, (as well as possible aromatics compounds) are more susceptible to being vaporized, and can thus be more easily inhaled and absorbed through the open pores of the person taking a shower or bath. Whole house water purification systems are effective in removing the chlorine and other substances before they impact the residents. However, some experts believe that with whole house water purification systems designed to remove chlorine, after some time, the residual chlorine in the water contained within the house's piping will decrease to very low levels, and allow bacteria and other organisms to actually become established and grow in the piping. Because of the potential problems with this, it may be preferable for chlorine removal to take place as close to the point of water egress as possible.

There accordingly remains a need for a water filter specifically adapted for use in bathtubs, particular bathtub spouts.

SUMMARY OF THE INVENTION

Accordingly, it is an object of the present invention to provide an improved water filter adapted to be retained in a bathtub spout.

It is a further objective of the present invention to provide a replaceable water filter that is adapted to fit into a standard bathtub spout.

It is yet a further objective of the present invention to provide a bathtub spout with a built-in water filter.

Another objective of the present invention is to provide a kit for do-it-yourselfers to convert standard bathtub spouts into water filter bathtub spouts.

These and other aspects of the invention are met by the present device that comprises filter material, a filter body with front and rear ends, the front and rear ends having threaded ends. The front threaded end is adapted to screw into the water egress end of the water spout. The threaded rear end is adapted to screw into the spout water supply line extending from the shower stall. The filter body is sized to fit into the bathtub spout, and can have a conical or other shape.

DETAILED DESCRIPTION OF THE PREFERRED EMBODIMENTS

Figure 1:
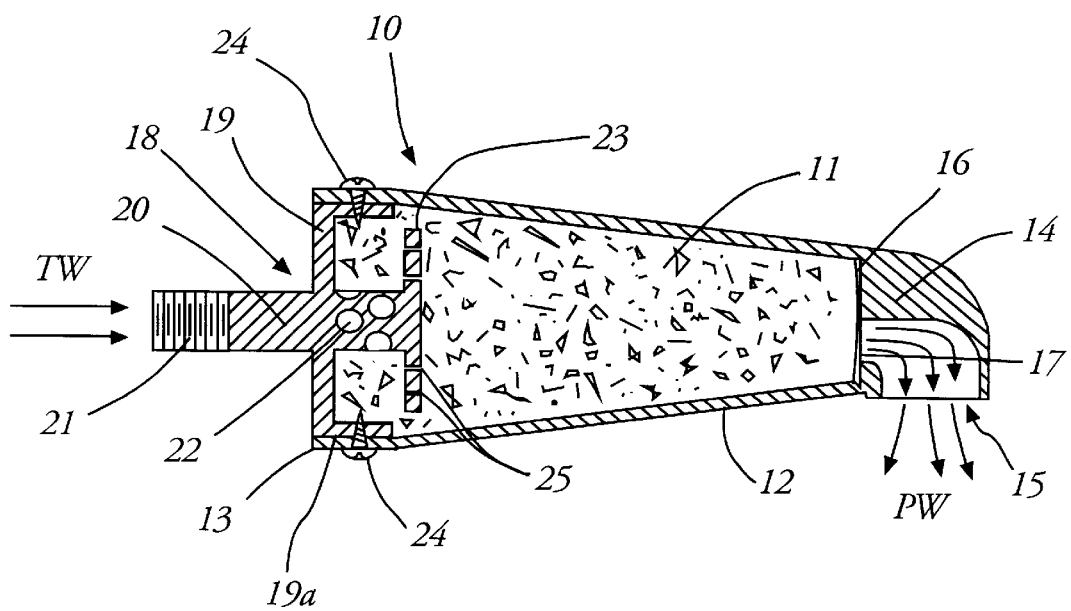
FIG. 1 is cross-sectional view of a first embodiment of the bathtub spout filter.
Figure 2:
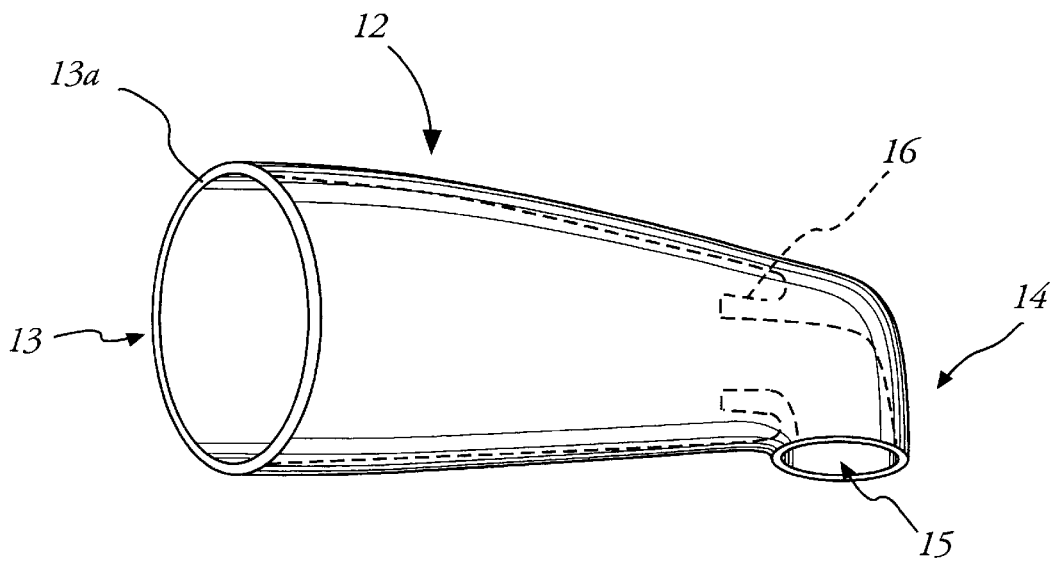
FIG. 2 is perspective view of a conventional, prior art bathtub spout.

Turning first to FIG. 1, a first embodiment of a filter bathtub spout 10 of the invention is shown. Filter media 11 is sealed within a bathtub spout body 12, such as shown in FIG. 2. Bathtub spout body 12 has an open rear 13 with a flattened end 13a that normally is positioned against the wall of the bathtub or shower stall (not shown.) Front end 14 has a water egress spout opening 15. Placed against a front most area 16 just behind water egress spout opening 15 is means to prevent loss of filter material from the spout body 17, such as section of screen 17 to prevent filter media 11 from escaping. A backing portion 18 has a plate portion 19 that tightly and sealably fits into open rear 13 of bathtub spout body 12 and closes the open rear 13 of the spout body 12. Plate portion 19 preferably has a rim area 19a adapted to slide into close contact with inside wall of bathtub spout body 12 near open rear 13. Backing portion 18 has an extension tube 20, preferably with a rearwardly extending male threaded end 21 which is adapted to screw into a female threaded fitting in the shower stall wall (or bathtub.) A plurality of tube egress apertures 22 are formed in the portion of extension tube 20 forward of radial plate portion 19. An optional deflector portion 23 at the front of the extension tube 20 will help ensure that tap water passing through tube egress apertures 22 is evenly dispersed through filter media 11. Deflector portion 23 can be solid, or can also have a plurality of apertures 25 formed therethrough. Backing portion 18 can be fixably retained in open end 13 of spout body 12 by set screws 24 or other known means. Plain tap water ("TW") will pass through extension tube 20 and out tube egress apertures 22 and into the filter media 11 present in bathtub spout body 12, and travel to the front of the spout 16. Screen 17 will prevent filter media 11 from escaping, and the now filtered and purified water ("PW") will exit spout opening 15. This filter 10 of this embodiment allows a conventional bathtub spout to be "recharged" multiple times with new filter media 11 as may be required, and the various parts can be presented in a kit form.

Figure 3:
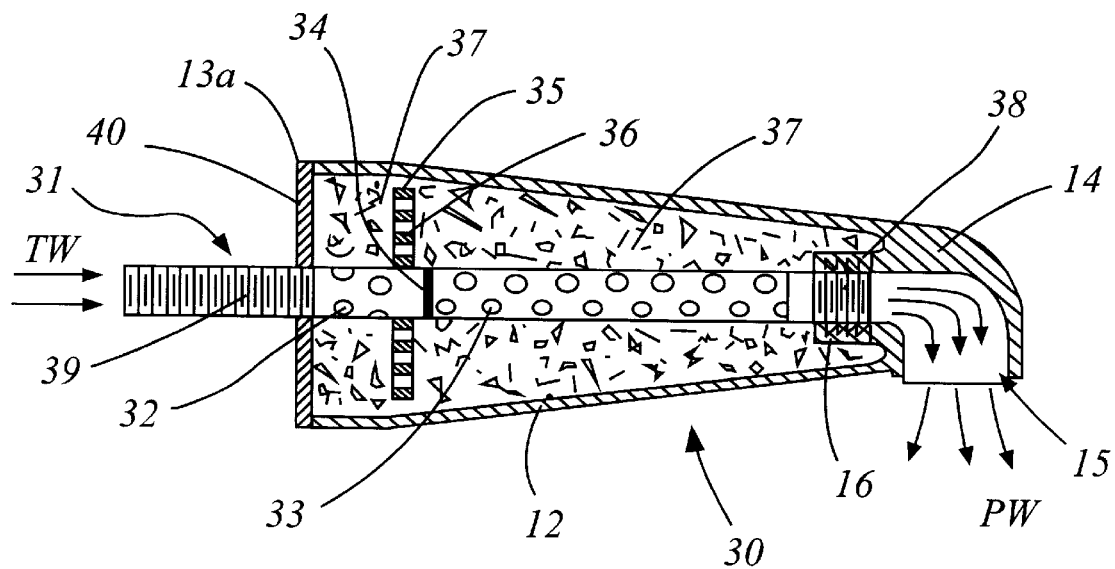
FIG. 3 is cross-sectional view of a second embodiment of a bathtub spout filter.

Referring to FIG. 3, a second embodiment of the invention is shown. This embodiment provides a rebuildable spout/filter 30. It can use a standard metal spout 12, and includes a diffusing pipe 31. Water pipe or diffusing pipe 31 has at least one and preferably a plurality of proximal apertures 32 and at least one and preferably a plurality of distal apertures 33, with a plug means 34 located in diffusing pipe 31 between the proximal apertures 32 and of distal apertures 33 to separate the pipe 31 into two sections. While proximal apertures 32 and distal apertures 33 are shown as relatively large, they can be small and numerous, and/or covered with screen material to prevent filter media 37 from escaping. Preferably, a diffuser plate 35 is positioned around diffusing pipe 31 and can preferably have apertures 36 formed therethrough. Diffuser plate 35 is positioned on diffusing pipe 31 between the position of proximal apertures 32 and distal apertures 33. Tap water TW will flow through pipe 31 at its inlet, flow out through proximal apertures 32, through filter media 37 located proximal of diffuser plate 35, through apertures 36 in diffuser plate 35, through filter media 37 distal of diffuser plate 35, back into diffusing pipe 31 through distal apertures 33, and out the spout's mouth 15. Plug means 34 acts to separate diffusing pipe 31 into two sections, and ensure that water flowing out of apertures 32 will pass back into pipe 31 through apertures 33, thereby ensuring that water will flow through filter media 37. Diffusing pipe 31 has a male threaded front end 38 and male threaded rear end 39. Backing plate 40 can preferably thread or otherwise securely attach to diffusing pipe 31 (or otherwise is attachable thereto) and water tightly seats against flattened end 13a of end 13 of metal spout 12 and preventing leakage, thereby retaining filter media 37 safely inside. Male threaded front end 38 threads into a female threaded inside end 16 of a standard metal or plastic spout 12. If desired, this second embodiment can be provided in a kit so a user can convert a standard metal spout into a filter spout.

Figure 4:
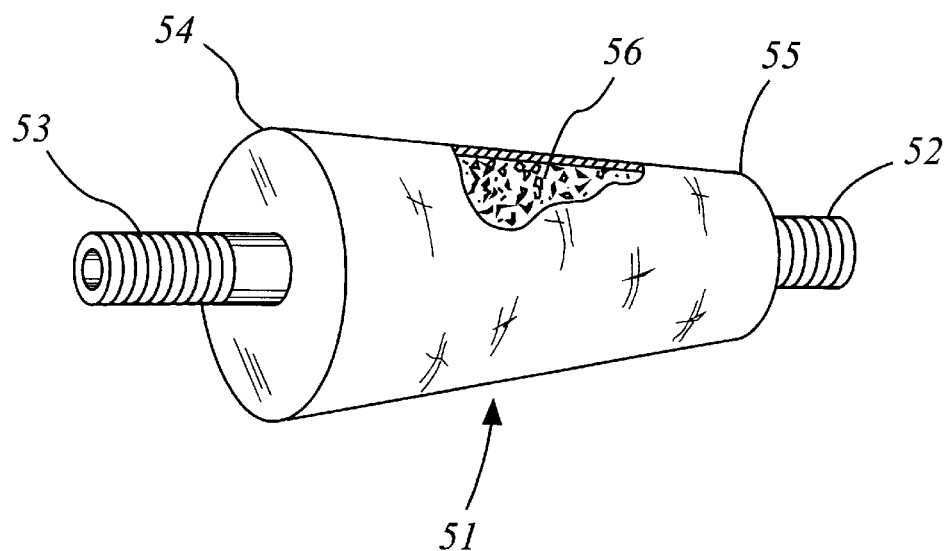
FIG. 4 is perspective view of a third embodiment of the invention, in the form of a disposable filter cartridge adapted to fit in a conventional bathtub spout.
Figure 5:
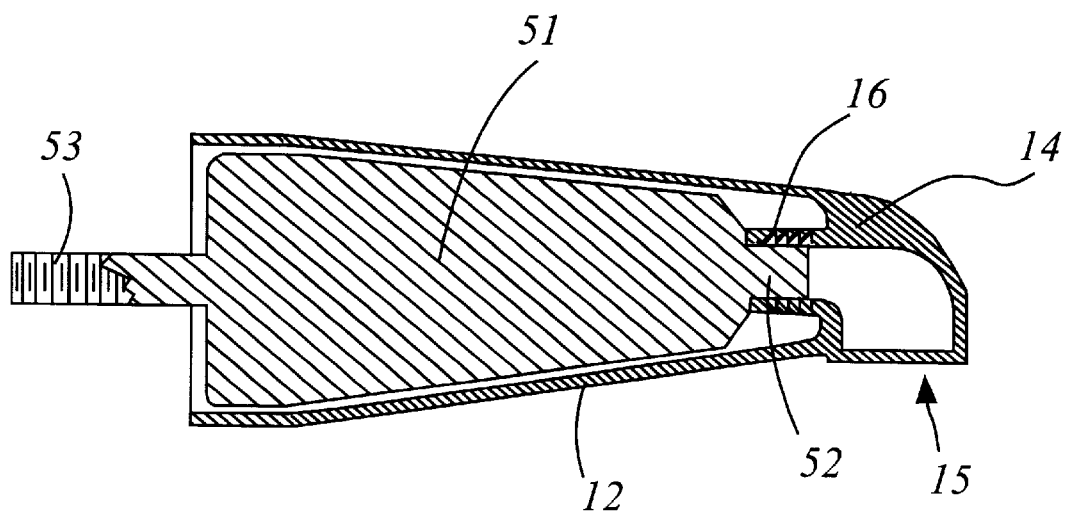
FIG. 5 is cross-sectional view of the third embodiment of the filter in a conventional bathtub spout.

A third embodiment of the device 50 is shown in FIGS. 4 and 5. In this embodiment a specialized disposable filter cartridge 51 is adapted to fit into a conventional bathtub spout 12. Disposable filter cartridge 51 has a male threaded front portion 52 which is adapted to screw into female threaded inside end 16 of spout 12 (which is normally adapted to be threaded onto a section of ½ inch threaded nipple) and has a male threaded rear portion 53. Male end 53 of the filter cartridge 51 is threaded into the spout water fitting in the wall. In order to fit into standard bathtub spouts 12, filter cartridge 51 is preferably generally cone-shaped, narrowing from a wider rear end 54 to a narrower front end 55. The conical shape is adapted so that filter cartridge 51 will fit into a standard metal spout 12. Filter cartridge is filled with filter media 56 as are the other embodiments.

For the various embodiments of the invention, various known filter media can be used, such as activated carbon, spun polyester fiber, or one of the new materials, including KDF, which lasts about 10 to 20 times longer than activated carbon. The drawings and the foregoing description are not intended to represent the only form of the invention in regard to the details of its methodology and manner of operation. In fact, it will be evident to one skilled in the art that modifications and variations may be made without departing from the spirit and scope of the invention. Although specific terms have been employed, they are intended in a generic and descriptive sense only and not for the purpose of limitation, the invention being set forth in the following claims.

I claim:

1. A bathtub water receiving, filtering, and dispensing apparatus, comprising:

a bathtub filler spout including an elongated substantially horizontally extending housing having front and rear end portions and a longitudinal axis, a top surface, a bottom surface, a vertically disposed rear opening facing rearwardly from the rear end portion in substantially coaxial relation with the housing, a horizontally disposed outlet opening facing downwardly from the bottom surface at the front end portion in angular relation to said axis, an internal water chamber extending lengthwise of the housing and having a rearward portion communicating with the rear opening and a forward portion communicating with the outlet opening;

a water filter removably received in the chamber having a rear inlet portion adjacent to the rear opening and a front end portion in fluid communication with the outlet opening, said water filter including a filter cartridge filled with a filter media; and a substantially horizontally extending water inlet conduit assembled with the water filter having a forward end portion extending through the rear opening into the chamber and an externally threaded rearward end portion extending rearwardly from and outside of the housing in substantially coaxial relation therewith, the rearward end portion being threadable into a source of water.

2. The apparatus of claim 1, wherein the chamber is of substantially frusto-conical shape; and wherein the cartridge is of substantially frusto-conical shape.

3. The apparatus of claim 2, wherein the filter media has the frusto-conical shape of the cartridge.

4. The apparatus of claim 1, wherein the cartridge is removably fitted through the rear opening and into the chamber.

5. The apparatus of claim 1, wherein the cartridge has a front end portion releasably connected to the front end portion of the housing.

6. The apparatus of claim 5, wherein the front end portion of the cartridge is threadably connected to the front end of the housing.

7. The apparatus of claim 6, wherein there is a threaded fitting at the front end portion of the housing rearwardly extending into the chamber; and wherein the front end portion of the cartridge is threaded to the fitting.

8. The apparatus of claim 1, wherein the spout is of substantially standard size and shape as used for a bathtub.

9. The combination of:

a bathtub; and a bathtub filler spout including an elongated housing removably extending in a substantially horizontal position over the bathtub, the spout having front and rear end portions and a longitudinal axis, a top surface, a bottom surface, a vertically disposed rear opening facing rearwardly from the rear end portion, a horizontally disposed outlet opening facing downwardly from the bottom surface at the front end portion and over the bathtub, an internal water chamber extending lengthwise of the housing and having a rearward portion communicating with the rear opening and a forward portion communicating with the outlet opening;

a water filter removably received in the chamber having a rear inlet portion adjacent to the rear opening and a front end portion in fluid communication with the outlet opening, said water filter including a filter cartridge filled with a filter media; and a substantially horizontally extending water inlet conduit assembled with the water filter having a forward end portion extending through the rear opening into the chamber and an externally threaded rearward end portion extending rearwardly from and outside of the housing, the rearward end portion being threadable into a source of water for the bathtub.

* * * * *